(12) United States Patent
Garniss et al.

(10) Patent No.: US 7,765,918 B2
(45) Date of Patent: Aug. 3, 2010

(54) COMBINATION CONVEYOR OVEN

(75) Inventors: Russell Garniss, Menominee, MI (US); Matthew Deming, Menominee, MI (US); Najib H. Maalouf, Menominee, MI (US)

(73) Assignee: Nu-Vu Food Service Systems, Menominee, MI (US)

( * ) Notice: Subject to any disclaimer, the term of this patent is extended or adjusted under 35 U.S.C. 154(b) by 498 days.

(21) Appl. No.: 11/748,316

(22) Filed: May 14, 2007

(65) Prior Publication Data

US 2008/0032018 A1 Feb. 7, 2008

Related U.S. Application Data

(60) Provisional application No. 60/801,831, filed on May 19, 2006.

(51) Int. Cl.
*A47J 37/04* (2006.01)
*A47G 21/00* (2006.01)

(52) U.S. Cl. ............... 99/330; 99/326; 99/333; 99/337; 99/338; 99/483; 99/443 R; 99/451; 99/386; 99/401; 126/20; 126/20.1; 126/21 R; 219/492; 219/497; 219/702; 219/714; 219/388; 219/400; 219/775; 219/779

(58) Field of Classification Search ........... 99/326–333, 99/337–338, 483, 443 R–451, 386, 401; 219/492–497, 219/775–779, 702–714, 388, 400; 126/21 A, 126/21 R, 20, 20.1
See application file for complete search history.

(56) References Cited

U.S. PATENT DOCUMENTS

| 3,881,403 | A | | 5/1975 | Ingram et al. |
| 4,961,373 | A | * | 10/1990 | Milone .................. 99/355 |
| 5,049,711 | A | * | 9/1991 | August .................. 219/680 |
| 5,080,087 | A | | 1/1992 | McFadden et al. |
| 5,207,151 | A | * | 5/1993 | Le Viet et al. .......... 99/451 |
| 5,560,287 | A | * | 10/1996 | Petelle et al. .......... 99/451 |
| 6,382,964 | B2 | * | 5/2002 | Sakamoto et al. ....... 432/171 |
| 6,572,911 | B1 | | 6/2003 | Corcoran et al. |
| 6,717,120 | B2 | * | 4/2004 | Fritts et al. ............. 219/700 |
| 6,817,283 | B2 | | 11/2004 | Jones et al. |
| 6,903,318 | B2 | | 6/2005 | Thorneywork |
| 6,914,226 | B2 | | 7/2005 | Ottaway |

FOREIGN PATENT DOCUMENTS

| DE | 19820061 A1 | 12/1998 |
| GB | 1462693 A | 1/1977 |
| WO | WO 2004/026034 A | 4/2004 |

OTHER PUBLICATIONS

International Search Report for International Applicantion No. PCT/US2007/011509, dated Nov. 28, 2007, 5 pgs.
IPER dated Dec. 4, 2008 for related PCT/US2007/011509.

* cited by examiner

*Primary Examiner*—Shawntina Fuqua
(74) *Attorney, Agent, or Firm*—Brinks Hofer Gilson & Lione (57) ABSTRACT

An oven for heating a product is provided. The oven includes a partially enclosed housing with an inlet opening and an outlet opening and a conveyor to move a product through the housing. The oven additionally includes a steam system for boiling liquid with an associated steam pipe and a heating element provided within the housing.

14 Claims, 6 Drawing Sheets

FIG. 9

COMBINATION CONVEYOR OVEN

This application claims priority from U.S. Provisional Application No. 60/801,831, filed on May 19, 2006, the entirety of which is hereby full incorporated herein by reference.

TECHNICAL FIELD

The present disclosure relates to the field of ovens to heat food products. Specifically, the present disclosure relates to conveyor ovens used to heat food products.

BACKGROUND

It is known in the art to provide an open ended oven with a moving conveyor belt that extends through the oven to move a food product through the oven. A typical conveyor oven includes a plurality of radiant heating elements located within the oven to provide a significant heat source to cook a food product that rides through the oven on the conveyor.

Other types of conveyor ovens bake a food product made from dough by adding steam to the stream of hot air and imparting the mixture upon the product as it moves through the oven on a conveyor. This type of oven includes two open ends that are connected with a conveyor. The oven imparts air and saturated steam upon a dough product, such as a bagel, to bake the bagel as it moves through the oven on the conveyor. By exposing the bagel to a moisture-rich steam environment, the bagel is properly baked while allowing it to obtain the familiar hard and shiny exterior surface with the soft internal breading.

Although suitable for baking certain types of dough products, the moisture rich saturated steam makes this type of oven unsuitable for broader applications, namely the cooking of other types of food products, such as full sandwiches, vegetables and pizza. The high moisture content within a steam-based oven can significantly wet the exterior surfaces of the sandwich or the pizza, ruining the food products.

Ceramic or similar types of heating elements are sometimes used within an open ended conveyor style oven to provide sufficient radiant heat to cook a food product that moves through the oven on a conveyor. These types of ovens are currently used in many restaurants that sell custom made heated sandwiches. A problem in ovens with ceramic heating elements is that in moisture-rich environments, the heating elements have a tendency to crack or otherwise brittle fracture, which reduces the useful life of a ceramic heating element. This phenomenon may occur when moisture enters gaps or other imperfections inherently present in typical ceramic heaters during periods when the heaters are cooled to ambient temperature. If the heaters rapidly warm, the moisture may boil before it has time to migrate out of the heater. The boiling of the moisture causes rapid expansion and increases the pressure within the gap, which may cause cracking or fracture. It is therefore desired to provide a method to heat an oven that includes ceramic or other similar heating elements to avoid problems with cracking or brittle fracture.

It takes a significant amount of time and energy to heat a typical conveyor type oven to normal operating temperature, and when the oven is operating at normal temperature, the oven requires a significant amount of energy to operate. There are often periods when the oven will be maintained at operating temperature because it is expected that the oven will again be used to cook a food product, without an immediate need to cook a food product. While it is often possible to manually reduce the operating temperature of the oven to conserve energy, it is desired to provide an improved mechanism for conserving energy when the oven is not being used As is known, the exterior surfaces of a conveyor oven typically are heated to temperatures significantly above ambient when the oven is at a normal operating temperature. As can be understood, and has been experienced by many restaurant industry employees, the elevated temperatures of the external surfaces of the oven may lead to burns if the employee's exposed skin contacts the oven's external surface during operation. Accordingly, it is desired to provide an oven that has external surfaces that will not cause burn injuries if they are accidentally contacted by exposed skin when the oven is at normal operating temperature.

BRIEF SUMMARY

In order to address the deficiencies of prior conveyor ovens discussed above, an oven and method of use are described below. According to a first aspect, an oven for heating a food product is provided. The oven includes a housing with an inlet opening and an outlet opening and a conveyor to move a food product through the housing from the inlet opening to the outlet opening. A steam generator is disposed within the enclosure for boiling liquid and a steam pipe is provided within the housing and in fluid communication with the steam generator. A plurality of heating elements are provided within the housing and between the steam pipe and the outlet opening.

According to a second aspect, a method for warming an oven with a conveyor and a plurality of ceramic heating elements is provided comprising the steps of providing electrical power to a controller and a plurality of heating elements and providing electrical power to the plurality of heating elements until the plurality of heating elements reach a first intermediate temperature. The steps of maintaining the plurality of heating elements at the first intermediate temperature for a first predetermined time period and providing electrical power to the plurality of heating elements until the plurality of heating elements reach a second intermediate temperature greater than the first intermediate temperature are also provided. Finally the method includes the steps of maintaining the plurality of heating elements at the second intermediate temperature for a second predetermined time period and providing electrical power to the plurality of heating elements until the plurality of heating elements reach a selected temperature, and maintaining the plurality of heating elements at the selected temperature.

According to a third aspect, a method for conserving energy used by a conveyor oven with a housing substantially enclosing the oven and a plurality of heating elements provided within the housing is provided. The method comprises the steps of providing a sensor located near an inlet opening of the housing that is operatively connected with the controller and connecting the controller to the plurality of heating elements to control the amount of current flowing to the heating elements. Further, the method includes the steps of lowering the amount of current from a reduced predetermined amount to a portion of the plurality of heating elements when the sensor does not detect a product on the conveyor for a selected period of time and increasing the current to predetermined amount to the portion of the plurality of heating elements when the sensor detects a product moving along the conveyor through the inlet opening.

According to a fourth aspect a method for heating a food product is provided. The method includes the steps of receiving a food product in an enclosure and advancing the food product therethrough and applying steam to the food product in a first portion of the enclosure proximate a first open end of the enclosure, wherein energy from the steam substantially infuses within an internal volume of the food product The method further includes the step of applying dry heat to the food product in a second portion of the enclosure after passing by the first portion.

According to a fifth aspect, an oven for heating a food product is provided. The oven includes a housing with an inlet opening and an outlet opening and a conveyor to move a food product through the housing from the inlet opening to the outlet opening. The oven additionally includes a steam generator for producing steam from liquid provided to the steam generator is provided and a steam pipe within the housing and in fluid communication with the steam generator. The steam pipe and the steam generator are configured to direct a source of steam toward the food product and energy from the steam to infuse within an internal volume of the food product. The oven additionally includes a plurality of heating elements provided within the housing and between the steam pipe and the outlet opening.

Advantages of the disclosed oven and methods of use will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 6 is a perspective view of the combination conveyor oven of FIG. 1 showing a portion of the internal cooling air flow path with the rear panel and a portion of the right panel removed.

DETAILED DESCRIPTION

Although the following detailed description is focused on a conveyor-type oven, the embodiments discussed below can be successfully implemented in other types of ovens or heating apparatuses.

Turning now to FIGS. 1-6, a combination conveyor oven 10 is provided. Generally, the oven 10 includes a housing 20, a conveyor system 30, a steam system 40, a radiant heating system 60, and a forced convection system 80. Each of the steam system 40, the radiant heating system 60, and the forced convection system 80 are operatively controlled by a controller 124 that is provided within the housing 20 and operates each of the components based on the operating condition of the oven 10 as well as signals from a plurality of sensors provided within the oven 10. Accordingly, by selective operation of each of the steam system 40, the radiant heating system 60, and the forced convection system 80, a food product 12 may be fully cooked or toasted within the time it takes the food product 12 to be moved between an inlet opening 24a of the housing 20 and an outlet opening 25a of the housing 20.

The oven 10 with the steam, radiant heating, and forced convection systems 40, 60, and 80 is suitable for use in the food service industry for cooking food products 12 for immediate serving to a customer. For example, the oven 10 is suitable for heating the internal volume of a food product 12 as well as toasting/browning the external surface of the food product 12 as the food product 12 moves along the conveyor system 30.

The oven 10 may be used to cook a food product 12, such as a sandwich with multiple layers of bread at least partially surrounding one or more layers of protein (cold cuts, etc.), one or more layers of cheese, one or more layers of other food items disposed within the sandwich, and one or more dressings or toppings (such as mayonnaise, mustard, etc). The oven 10 is configured to apply a significant amount of heat to the food product 12, while not burning or carbonizing the external surfaces of the food product 12, and not making an external surface or any other portion of the food product 12 wet, damp, or soggy when presented to the customer. The oven 10 may be configured for use by the food service industry, wherein the oven 10 is configured to heat a food product and/or toast or brown the external surface of the food product 12 for immediate presentation of the food product 12 to the customer for consumption.

The oven 10 is described herein for use with a general food product 12. As is known by those of ordinary skill in the art, the disclosed conveyor oven 10 may be used with a plurality of different food products 12. For example, the conveyor oven 10 may be used to cook sandwiches and pizzas. As can be understood, the oven 10 can be structurally modified to efficiently cook a large number of different types of food products 12 within the scope of the invention.

The housing 20 is generally formed by a plurality of flat plates that are rigidly connected together. As is known in the art, the plates may be formed from metal or another material with appropriate strength and weight properties. In some preferred embodiments, stainless steel may be used to manufacture the outer side surfaces of the oven, as well as the inner structural supports, because of its relatively low cost, availability, as well as the fact that stainless steel does not rust or oxidize in a high moisture environment. The housing 20 includes right and left side plates 21, 22, top and bottom plates 23, 26, and front and rear plates 24, 25. The plates may be rigidly attached together in a number of ways that are known to those of ordinary skill in the art. In some embodiments, the plates may be attached together with a plurality of fasteners. In other embodiments, the plates may be welded together.

The housing 20 is additionally formed with an internal cooking volume 14 that includes the conveyor system 30, heat output portions of the steam system 40, radiant heating system 60, and the forced convection system 80. The internal cooking volume 14 is formed by internal right, left, and top walls 15, 16, 17 which form a volume to allow the food product 12 to move through the housing 20 between the inlet and outlet openings 24a, 25a to sufficiently heat the food product 12. Additionally, because the output portions of each heating system extends into the internal cooking volume 14, the heat is efficiently maintained in the relatively small volume for increased operational efficiency.

The housing 20 may include a first portion 20c that is in the vicinity of the inlet opening 24a of the housing 20 that provides steam from the steam system 40 to the food product 12 on the conveyor system 30. The housing 20 may include a second portion 20d between the first portion 20c and the outlet opening 24b that includes at least one of the radiant heating system 60 and the forced convection system 80.

The position of the steam system 40 to infuse steam on the food product 12 (or form a blanket around the external surface of the food product 12) on the conveyor system 30 provides for rapid cooking of the external surface and the internal volume of the food product 12, due to energy from the steam infusing or being conducted to the internal volume of the food product 12. Further, the dry heat systems (i.e. the radiant and forced convection systems 60, 80) may be downstream of the steam system 40 (and in some embodiments may be additionally disposed along with the steam system 40 in the first portion 20c) and dries and/or browns the food product 12 prior to exiting the housing outlet opening 24b by way of the conveyor system 30. The remainder of the housing 20 located outside of the internal cooking volume 14 forms the mechanical volume 18. The mechanical volume 18 encloses the majority of the components of each heating system in addition to several other mechanical and electrical components. In addition to the thermal benefits obtained from segregating the internal cooking volume 14 from the mechanical volume 18, separating the volumes prevents the food product 12 riding on the conveyors 32, 34 from being in the vicinity or contacting many of the mechanical components of the oven 10, which may not meet the cleanliness standards required for food preparation.

Each of the front and rear plates 24, 25 include opening apertures 24a, 25a that allow for the food product to be inserted and removed from the housing 20, and are large enough to allow a front end of the first conveyor 32 to extend through the inlet aperture 24a. Front and rear plates 24, 25 additionally include respective front and rear gates 24b, 25b which ride on tracks on the respective plates and can be manually opened or shut by the user. During frequent use of the oven 10, the front and rear gates 24b, 25b are normally maintained sufficiently open to allow a food product 12 to move through the housing 20 on the conveyor 30. During infrequent use with the oven maintained at operating temperature (or the energy saving mode discussed below), the front and rear gates 24b, 25b may be partially or fully closed by the user to prevent excessive heat loss from the oven 10.

The oven 10 may additionally be provided with a pivotable rear door 28 that extends from the housing 20 below the outlet opening 25a. The rear door 28 is normally closed rear door positioned such that it's top surface 28a (FIG. 1) is parallel to and contacts the back panel 25 of the housing 20. Accordingly, when the rear door 28 is closed, the outlet opening 25a is blocked, which substantially prevents heat from within the internal cooking volume 14 from escaping the oven 10 through the outlet opening 25a, improving the efficiency of the oven 10. When a food product 12 reaches the outlet opening 25a of the housing 20, the rear door 28 is opened due to the force of the food product 12 (moving along the conveyor 30) felt by the top surface 28a of the rear door 28. The rear door 28 is shown in the opened position in FIGS. 1 and 2. After the food product 12 is removed from the rear door 28, the rear door 28 returns to the closed system. In some embodiments, a counterweight 28b is provided to bias the rear door 28 into the closed position. In other embodiments, a spring (not shown) may be provided to bias the rear door 28 into the closed position.

The oven 10 is provided with a steam system 40 that includes a steam generator 41, a water source, and associated piping. As is known to those of ordinary skill in the art, the steam generator 41 receives liquid water and using a heat source, raises the temperature of the water such that the liquid water boils to saturated steam. If additional energy is provided to the steam, the steam becomes superheated which increases its thermal energy and raises the quality (i.e. lowers the moisture content) of the steam. The heat source provided with the steam generator 41 is normally powered from electric current, but in other embodiments, the heat may provided by burning combustion gas.

The steam generator 41 includes an inlet 42 that receives liquid water from a hose or a pipe that is connected to a permanent plumbing system. In some embodiments, an isolation valve 46 may be provided to selectively control the flow of water through the steam generator inlet 41. In some embodiments, the isolation valve 46 is a solenoid valve operated by the controller 124 such that water is provided to the steam generator 41 only when the oven 10 is in operation. In other embodiments the controller 124 opens the isolation valve 46 to provide water to the steam generator 41 only when a proximity sensor 122 (discussed in detail below) detects that a food product 12 has been placed on the conveyor 30. In other embodiments, the controller 124 may periodically briefly open the isolation valve 46 to allow a limited quantity of water to enter the steam generator 41 to provide periodic cooling to the steam generator 41 during prolonged operation of the oven 10 without a food product 12 being heated by the oven 10, and detected by the proximity sensor 122.

The steam generator 41 includes an outlet 44 that is fluidly connected to a plurality of steam pipes 48. Accordingly, the steam that is produced by the steam generator 41 flows through the steam pipes 48. The outlet pipe 44 preferably extends vertically above the steam generator 41 such that only steam and not liquid may flow through the outlet pipe 44. In some embodiments, the plurality of steam pipes 48 include a set of top pipes 50 that are oriented perpendicularly to the longitudinal axis 20a of the housing 20 and above the conveyor 30. In some embodiments, the plurality of steam pipes 48 include a plurality of side pipes 52 that extend substantially parallel to the longitudinal axis 20a of the housing 20 and on the right and left sides (respectively) of the first conveyor 32. Each of the top and side pipes 50, 52 extend into the internal cooking volume 14.

In some embodiments a pressure sensor 56 is provided in the steam piping 48 between the steam generator 41 and the top and side pipes 50, 52. The pressure sensor 56 detects pressure within the steam piping 48 and sends a signal to the controller 124 if the pressure within the steam piping 48 is above a specific pressure level. When the controller 124 receives the high pressure signal, the controller 124 causes the isolation valve 46 to shut, removing the source of water to the steam generator 41. In some embodiments, the pressure sensor 56 is calibrated to signal the controller 124 if the pressure within the steam piping 48 reaches 35 psi, although other appropriate setpoints may be used. The setpoint is preferably set well below the rated pressure limit of each of the components and connection joints within the steam system 40. Because the top and side pipes 50, 52 downstream of the sensor 56 include a plurality of apertures 54 as described below, the steam system 40 is an open system and it is not expected that steam pressure within the steam system 40 should reach the predetermined setpoint during operation.

Each of the top and side pipes 50, 52 include a plurality of apertures 54 formed in the vicinity of the conveyor 32 within the internal cooking volume 14. Accordingly, steam produced in the steam generator 41 flows through the outlet pipe 44, to one of the plurality of top or side pipes 50, 52, and then exits the steam system 40 by flowing through one of the plurality of apertures 54. Because the steam pressure within the pipes is higher than atmospheric pressure due to thermal expansion during boiling, the pressure differential between the steam and the ambient air within the internal cooking volume 14 causes the steam to flow through the apertures 54. In some embodiments, the apertures 54 are positioned in the vicinity of the first conveyor 32 (discussed in detail below) such that a large percentage of the steam leaving the piping creates a steam bath that envelops or contacts the food product 12 moving along the first conveyor 32.

As is known, steam exothermically condenses when it is cooled. Specifically, when relatively low pressure steam (i.e. on the order of 1 to 10 psi) condenses to liquid water, approximately 1000 BTU/lbm is given off to the surroundings. Accordingly, when the steam exiting the steam system 40 through the apertures 54 contacts the food product 12, a significant portion of the heat within the steam flows to the food product 12 due to the large temperature differential between the steam and the food product 12. When the steam is cooled, it rapidly condenses to liquid form, which causes the latent heat of condensation to transfer to the product as well. The heat transferred to the food product 12 causes the external temperature of the food product 12 to significantly rise. Additionally, a large portion of the heat at the external surface of the food product 12 is conducted or infuses to the internal volume of the food product 12, which increases the internal temperature of the food product 12.

In a preferred embodiment, the top and side pipes 50, 52 of the steam system 40 are provided within the internal cooking volume 14 in the vicinity of the inlet opening 24a. As discussed above, because the differential temperature between the steam and the food product 12 is the highest when the product is at the lowest temperature, the oven 10 is the most efficient when the food product 12 is in the vicinity of the steam system 40 prior to obtaining a significant amount of heat from the other heating systems.

Similarly, it is preferable that superheated steam exits the top and side pipes 50, 52 because superheated steam has more energy for the same mass of water than saturated steam. This maximizes the energy transfer to the food product 12 for the same amount of steam and limits the mass of water that is imparted on the food product 12 required to heat the food product 12.

Placing the steam system in this position with respect to the oven 10 (as well as designing the steam system to produce superheated steam) improves the efficiency of the oven 10 by reducing the required heat output from the radiant heating and forced convection systems 60, 80, which improves the overall efficiency of the oven 10. Additionally, because the radiant heaters 60 may be operated at lower temperatures (and the food product 12 may be in the vicinity of the remaining heating systems for shorter periods of time) the internal temperature of the food product 12 may be elevated to the desired temperature without burning the external surfaces of the food product 12, which is a known problem with ovens that expose external surfaces of a food product 12 to higher temperatures for longer periods of time.

Figure 2:
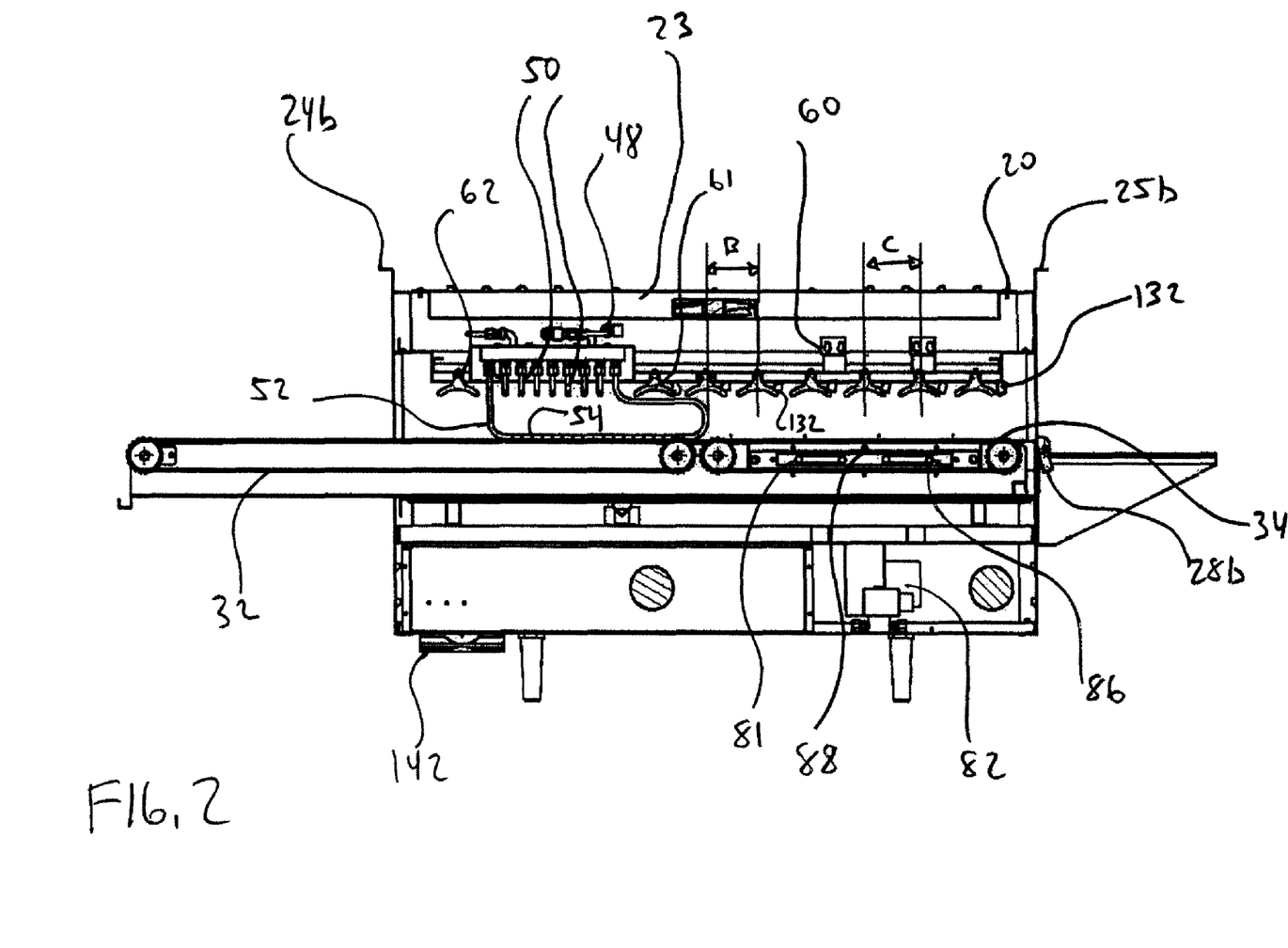
FIG. 2 is a right side cross-sectional view of the combination conveyor oven of FIG. 1.

As best shown in FIG. 2, a radiant heating system 60 is provided in the oven 10. It is preferred that the food product 12 encounter the radiant heating system 60 after passing by the steam system 40 to achieve the efficiency and cooking performance benefits, as discussed above. In other preferred embodiments, the radiant heating system 60 may be disposed along the entire length of the housing 20 to apply radiant heat to the food product 12 as it traverses along the entire housing 20 along the conveyor system 30. In embodiments where the radiant heat system 60 is disposed along the entire length of the housing 20, the heaters 61 may be disposed at even intervals along the length of the housing 20, or alternatively, the heaters 61 may be disposed with larger intervals near the inlet and outlet openings 24a, 24b, and smaller intervals in the central portion of the housing.

The radiant heating system 60 includes a plurality of radiant heaters 61 that extend into the internal cooking volume 14 and are positioned between the steam pipes 50, 52 and the outlet opening 25a of the housing 20. The heating elements 61 are preferably powered from electric current, but in other embodiments the heating elements 61 may be heated by burning combustion gas.

In some embodiments, the heating elements 61 may be positioned above the second conveyor 34 (discussed in detail below) with each of the plurality of heating elements 61 provided along a line parallel to the longitudinal axis 20a of the housing. Additionally, the neighboring heating elements 61 may be spaced at increasing distances from each other as the heating elements 61 are positioned further away from the steam pipes 50, 52. As shown in FIG. 2, two heating elements 61 that are relatively close to the steam pipes 50, 52 may be spaced apart from each other at a distance B. Further from the steam pipes 50, 52 along longitudinal axis 20a, two other heating elements 61 may be spaced at from each other at a larger distance C. In some embodiments, each neighboring heating element pair are spaced from each other at distances that linearly increase. In one representative embodiment, the two heating elements 61 that are positioned closest to the steam pipes 50, 52 may be spaced apart such that they neighboring sides are 0.5 inches apart, with the spacing increasing between each heater pair by 0.5 inches moving toward the outlet opening 25a. In other embodiments, the spacing between heating element pairs 61 may increase by different amounts.

The heating elements 61 are provided such that majority of the heat provided from the heating elements 61 is closer to the steam pipes 50, 52, than would be if the heating elements 61 were spaced at even intervals. This spacing allows for a majority of the heat to be exposed to the food product quickly after it passes through the superheated steam bath from the steam pipes 50, 52, which allows any excess moisture that collects on the food product 12 to quickly evaporate before it can soak into the food product 12. Additionally, placing the majority of the heating elements 61 closer to the center of the oven 10 minimizes the amount of heat that escapes to the environment through the outlet opening 25a, which allows the heating elements 61 to operate with lower energy requirements to maintain the desired temperature within the oven 10.

Each of the heating elements 61 is individually operated by the controller 124. In embodiments where the radiant heaters 61 are electrically powered, the controller 124 controls the amount of electric current that is sent to each heating element 61. Similarly, in embodiments where the radiant heaters 61 are heated with gas, the controller 124 operates an isolation/throttle valve (not shown) that controls the amount of gas that flows to each heating element 61.

In some embodiments, a single heating element 62 may be provided on the inlet side of the steam pipes 50, 52. Through experimentation, it was noted that during oven and steam system warm-up, a significant portion of the steam condensed into water (or a mixture of water vapor and liquid water) as the steam traveled between the steam generator 41 and the top and side steam piping 50, 52. As understood by those of ordinary skill in the art, when the oven 10 is initially heated up after an extended shutdown, the entire volume of the oven is at (or close to) ambient temperature. Accordingly, a significant amount of heat is required to raise the oven's internal components, including the piping of the steam system 40 to normal operating temperatures. As steam initially flowed through the steam piping, heat was transferred from the steam to warm the piping, which caused at least a portion of the steam to release its latent heat of condensation and convert to liquid water.

As shown in FIG. 2, the oven 10 includes heating elements 61, 62 on either side of the top and side steam pipes 50, 52 to preheat the steam piping before the controller 124 opens the isolation valve 46 to supply water to the steam generator 41. As discussed below, the oven 10 includes a specific "warm-up sequence" which causes the heating elements 61, 62 to be warmed to normal operating temperature before starting the steam system 40. Accordingly, when the steam system 40 is started and superheated steam travels through the steam piping 48, 50, 52, the piping should be close to the steam temperature, which substantially prevents any condensation of steam within the piping due to heat loss from the steam.

Because the radiant heaters 61 are individually powered and controlled, they may be selectively operated during operational periods where no food products 12 are cooked by the oven to conserve energy. Specifically, a proximity sensor 122 is provided in the vicinity of the inlet opening 24a and is positioned to detect the presence of a food product 12 on the conveyor 30 just prior to the food product 12 entering the housing 20. In some embodiments, the proximity sensor 122 is positioned to detect the presence of a food product 12 as it is initially placed on the first conveyor 32 (described below) before the food product 12 moves into the housing 20.

The proximity sensor 122 may be an "electric eye" or similar sensor that detects the presence of an object in the vicinity of the proximity sensor 122. In some embodiments, the proximity sensor 122 is similar to sensors used in automatic garage door openers to detect whether a person or object is under the door when the door is being automatically closed. The proximity sensor 122 may continuously sending a signal to a receiver, or with a single component that both sends and receives the signal, or in other embodiments, similar types of sensors that are known in the art may be used. The proximity sensor 122 sends a signal to the controller when it detects that an object, such as the food product 12, is provided on the conveyor 30. In some embodiments, the proximity sensor 122 may be movable to different locations with respect to the housing 20 depending on the type of food product 12 used with the oven 10.

During normal operation (i.e. when the oven 10 is warmed up to normal operating temperature) the controller 124 operates the oven in an "energy saving mode" when the proximity sensor 122 has not detected the presence of a food product 12 for a predetermined period of delay time. The delay time may be set by the factory when manufacturing the oven 10, or the delay time may be set by the user. After the predetermined delay time, the controller reduces the power flow (whether the amount of electrical current or gas) to a portion of the heating elements 61 to allow them to cool to a lower temperature. When the selected heating elements 61 reach a specific lower temperature, the controller maintains the selected heating elements 61 at the specific lower temperature and the remaining heating elements 61 at the normal operating temperature.

A plurality of temperature sensors 132 (FIG. 2) are provided on each heating element that each send signals that are proportional to the respective heating element's 61 temperature to the controller 124. The temperature sensors 132 may be any type of sensor known in the art. For example, the temperature sensor 132 may be a thermocouple, a resistance temperature detector, or a bi-metallic strip.

In other embodiments, the controller 124 may be calibrated such that the controller 124 provides a preprogrammed amount of current (or combustion gas) to each heating element 61 to produce a desired temperature of each heating element 61. For example, when the controller 124 attempts to heat the heating element 61 to a normal operating temperature, the controller allows a first amount of current to flow to the heating element 61. The controller 124 can lower the current level flowing to the heating element 61 to allow the output temperature of the heating element to cool to specific lower temperature.

When the proximity sensor 122 detects a food product 12 on the conveyor 30, the controller 124 increases the power flow to the selected heating elements 61 as detected by the temperature sensor 132. The specific lower temperature is selected such that the unit conserves a significant amount of energy when operating in energy saving mode, but allows the selected heating elements 61 to heat up to reach their normal operating temperature by the time the food product 12 moves within the vicinity of the heating elements 61. In some embodiments, the specific lower temperature is approximately 100° F. lower than the normal operating temperature.

In some embodiments, conventional ceramic heaters may be used as the heating elements 61. As is known in the art, ceramic heaters have a tendency to fracture or crack when they are rapidly heated in a moisture rich environment. Accordingly, the controller 124 operates the oven 10 in a "warm-up mode" when the oven 10 is initially energized with the oven at or near ambient temperature. The warm-up mode allows for a slow, controlled heat-up of the ceramic heating elements 61 such that any moisture within the heating elements 61 is evaporated and removed from the heating elements 61 during heat up. Specifically, during the warm-up cycle the controller 124 initially provides power to heat the heating elements 61 to a first intermediate temperature and then maintains them at that temperature for a first selected period of time. The controller 124 then heats the heating elements 61 to a higher second intermediate temperature and maintains them at that temperature for a second selected period of time. In some embodiments, the controller 124 then heats the heating elements 61 to a higher third intermediate temperature and maintains them at the third intermediate temperature for a third selected period of time. Eventually, the controller 124 allows the heating elements 61 to reach the predetermined normal operating temperature.

In a preferred specific embodiment, the controller 124 operates the heating elements 61 in the following manner during the warm-up mode. When the oven 10 is first turned on, the controller 124 causes the heating elements 61 to heat to approximately 300° F. and be maintained at this temperature for six minutes. Then the controller 124 causes the heating elements 61 to heat to approximately 600° F. and be maintained at this elevated temperature for six minutes. Next, the controller 124 causes the heating elements 61 to heat to approximately 1000° F. and be maintained at this elevated temperature for ten minutes. Finally, the controller 124 causes the heating elements 61 to heat to their normal operating temperature of 1200° F. While these specific temperature setpoints and time delays are used in a specific embodiment, other intermediate temperature setpoints and time delays may be used within the scope of this invention to allow for a gradual heat up to the normal operating temperature of the heating elements 61. This process substantially causes all moisture to be removed from the heating elements 61 before they reach their normal operating temperature.

While the heating elements 61 are designed to give off heat during operation, it is important to provide cooling for the electrical cabling and other associated components of electrical heating elements 61, which are located within the mechanical volume 18 of the housing. Accordingly, the heating elements 61 are provided with forced cooling. A heater fan 146 is provided on the top panel 23 of the housing 20 and takes suction from the ambient air through a plurality of inlet apertures 23b. A portion of the air flowing past through the heater fan 146 flows past the electrical components of the heating elements 61, providing cooling. The air then flows out of the oven 10 through the plurality of outlet apertures 23a. The forced cooling flow path is shown as flow path E on FIGS. 2 and 5.

Figure 3:
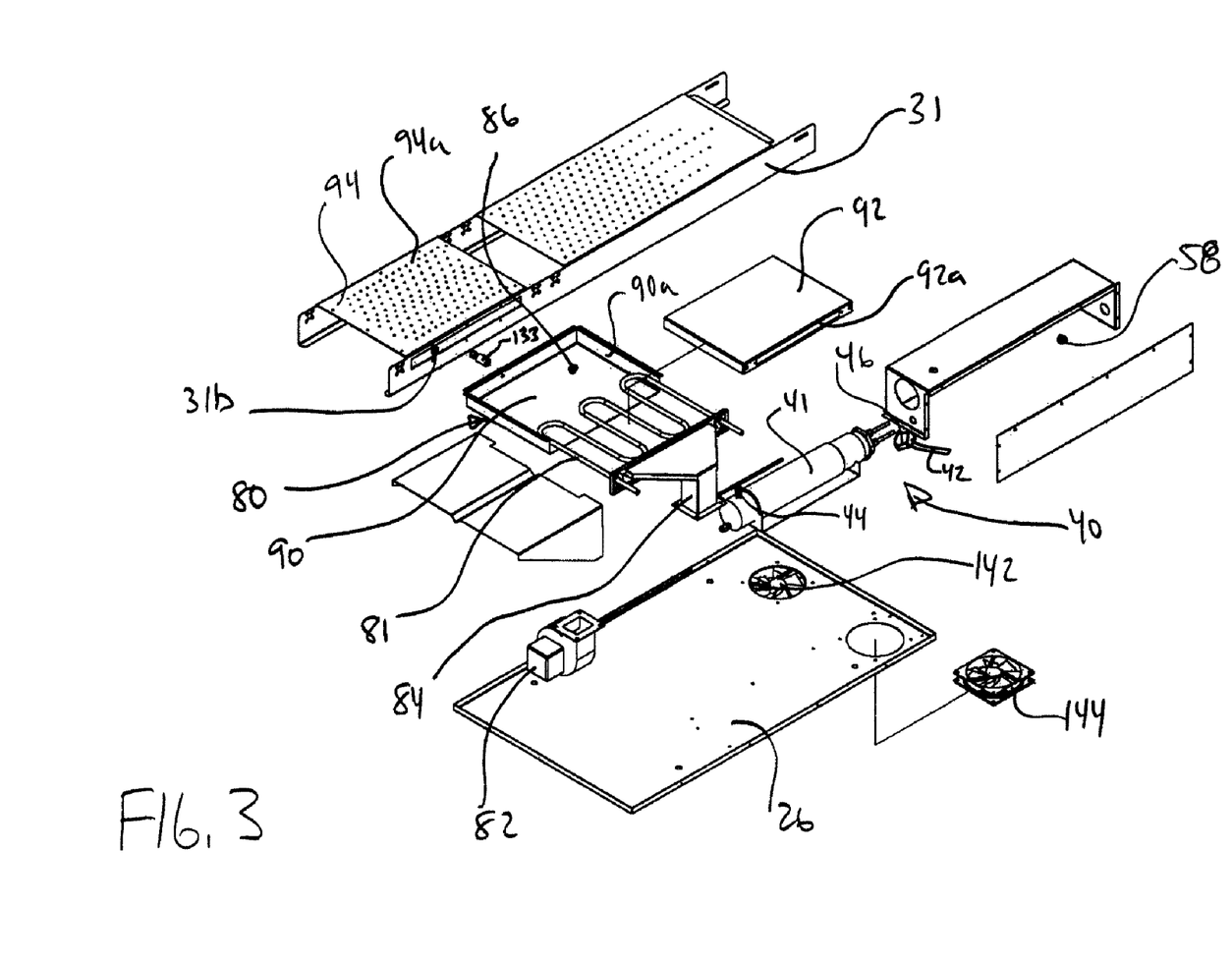
FIG. 3 is an exploded view showing several internal components of the combination conveyor oven of FIG. 1.
Figure 4:
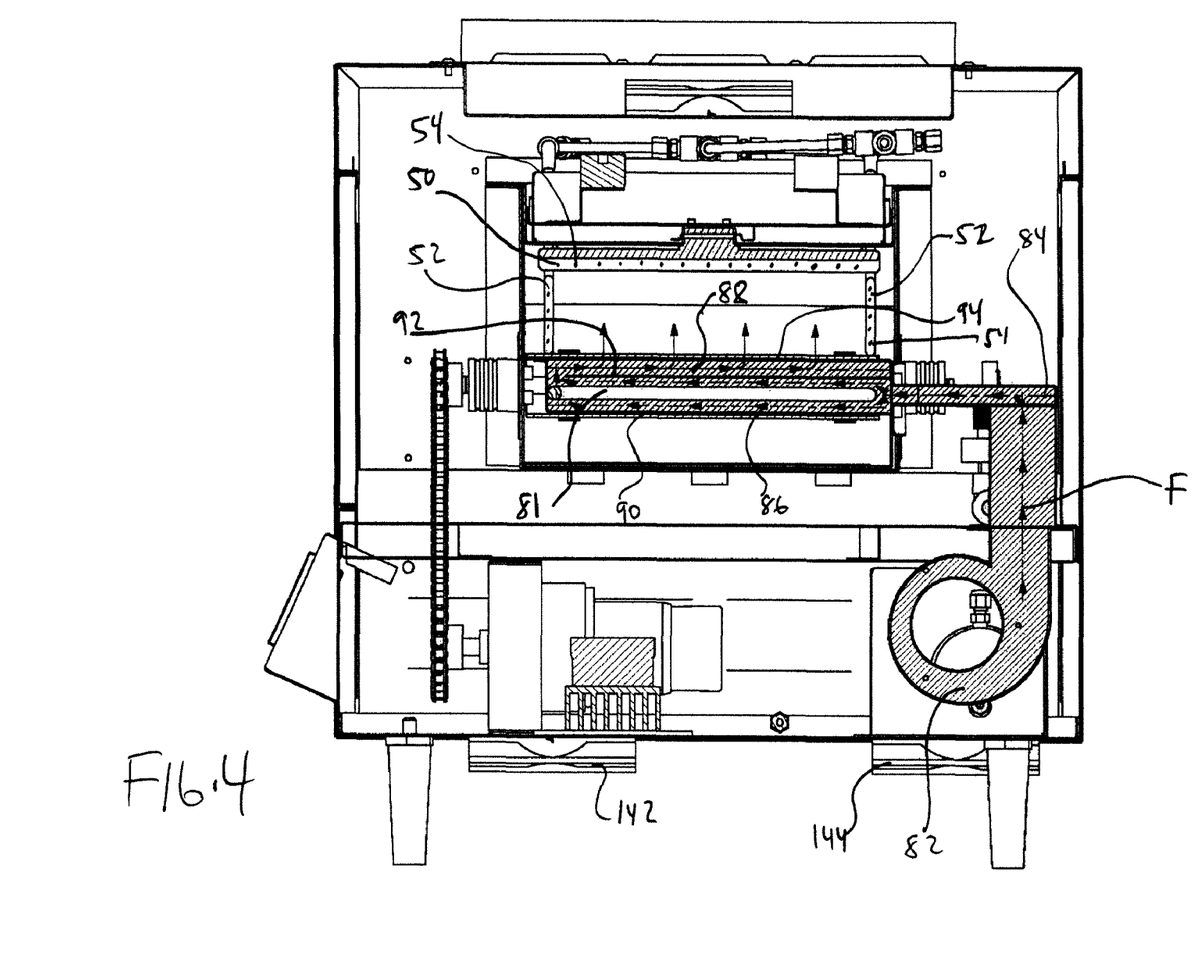
FIG. 4 is a cross-sectional view of the combination conveyor oven of FIG. 1 showing a portion of the forced convection flowpath.

In addition to the steam system 40 and the radiant heating system 60, a forced convection system 80 is provided, which is best shown in FIGS. 3 and 4. The forced convection system 80 includes a convection fan 82, a convection heating element 81, an air flow duct 84, and a plurality of divider plates. The convection fan 82 draws suction from the steam generator compartment 58, which encloses the steam generator 41 within the mechanical volume 18. In some embodiments, a steam generator fan 144 (shown in FIG. 3) provides forced flow of ambient air into the steam generator compartment 58 and past the steam generator 41. The air flow past the steam generator 41 removes heat from the steam generator 41, which helps to maintain it at a constant temperature regardless of the amount of steam flow through the steam generator 41. This air flow path also preheats the air flowing through the forced convection system 80, minimizing the energy consumption of the convection heating element 81 and improving the overall efficiency of the oven 10.

As best shown in FIG. 4, air flows through a portion of the air flow duct 84 after leaving the convection fan 82. The air flow duct 84 leads to a heating chamber 86 that substantially encloses the convection heating element 81. The operation of the convection heating element 81 may be controlled by the controller 124. In some embodiments, a temperature sensor 133 is provided within the heating chamber 86. The temperature sensor 133 may be made from any type of temperature sensing device that is known in the art. The temperature sensor 133 may be connected to the controller 124 and provides a signal proportional to the temperature detected by the temperature sensor 133.

The heating chamber 86 is substantially enclosed by a bottom plate 90 (which may include the side surfaces 90a of the bottom plate 90) and the bottom surface of an intermediate plate 92. After flowing through the heating chamber 86, air enters the outlet chamber 88. Accordingly, before entering the outlet chamber 88, the air has completely passed over the heating element 81, which provides even heating of all air flowing through the forced convection system 80. The outlet chamber is formed by the top surface of the intermediate plate 92, the side surfaces 90b of the bottom plate 90 and the bottom surface of the top plate 94. Because the outlet chamber 88 is provided above the heating chamber 86, with the two divided by the intermediate plate 92, some additional heat (originally provided by heating element 81) is transferred to the intermediate plate 92 by radiation and then to the air within the outlet chamber 88 by convection.

The top plate 94 is formed with a plurality of apertures 94a to allow the forced air to flow through the top plate 94. The top plate 94 may be attached to the conveyor frame 31 and may be located below the second conveyor 34. In some embodiments, the top plate 94 is additionally located substantially below at least some of the plurality of heating elements 61. In still other embodiments, the top plate 94, and the remaining structural components of the forced convection system 80, may additionally be disposed below the steam system 40 to provide forced heated convection air to the food product 12 as it moves through the steam bath and transfer additional heat to the food product 12.

In embodiments where the forced convection system 80 is provided at least in the vicinity of the second conveyor 34, when the food product 12 moves along the second conveyor 34 (after passing the front and side steam pipes 50, 52) the top surface of the food product 12 is exposed to the heat radiating from the heating elements 61 and the bottom surface of the food product 12 is exposed to the heated convection air flowing through the apertures 94a in the top plate 94.

Figure 1:
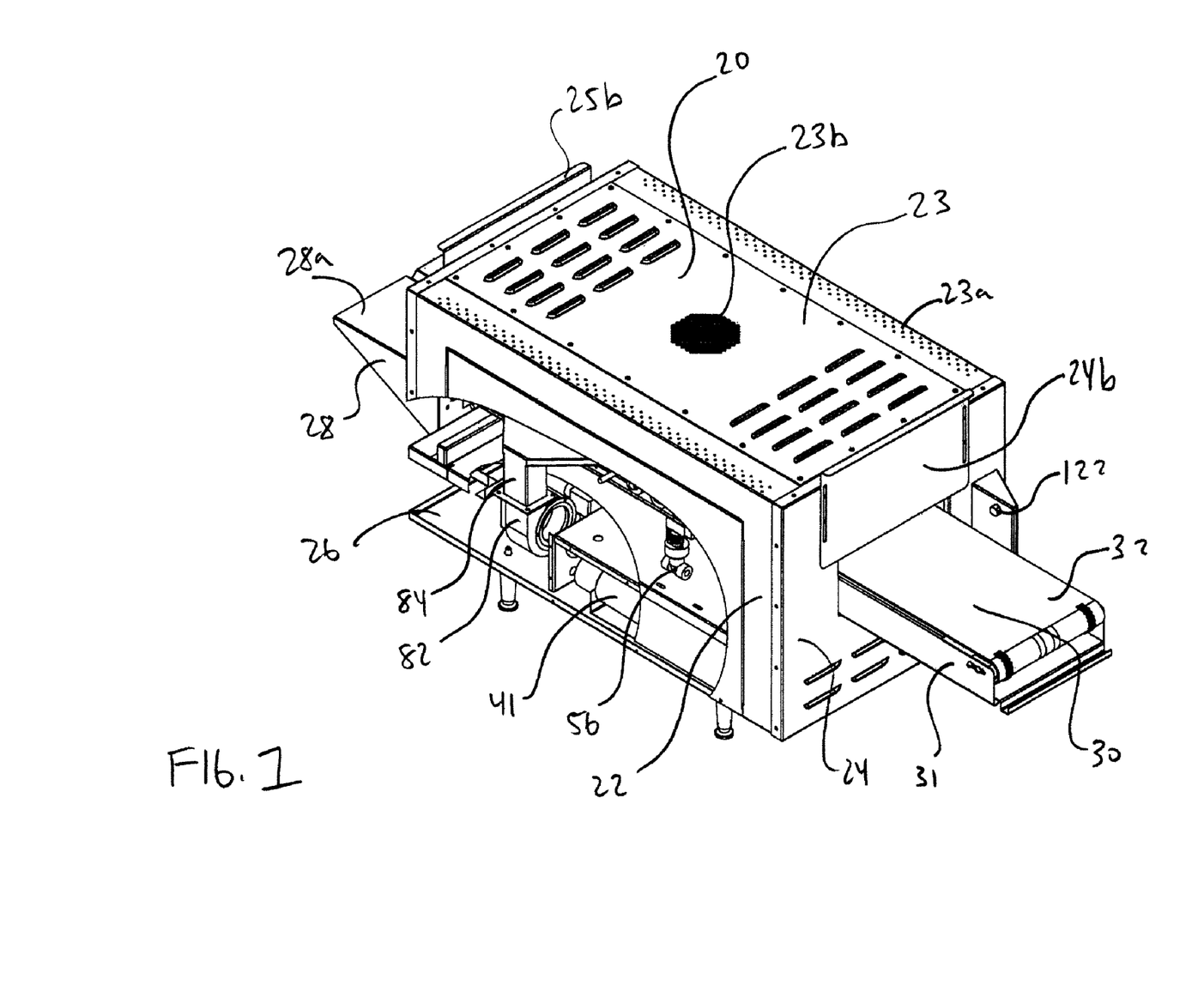
FIG. 1 is a perspective view of a combination conveyer oven with a portion of the side surface removed.
Figure 5:
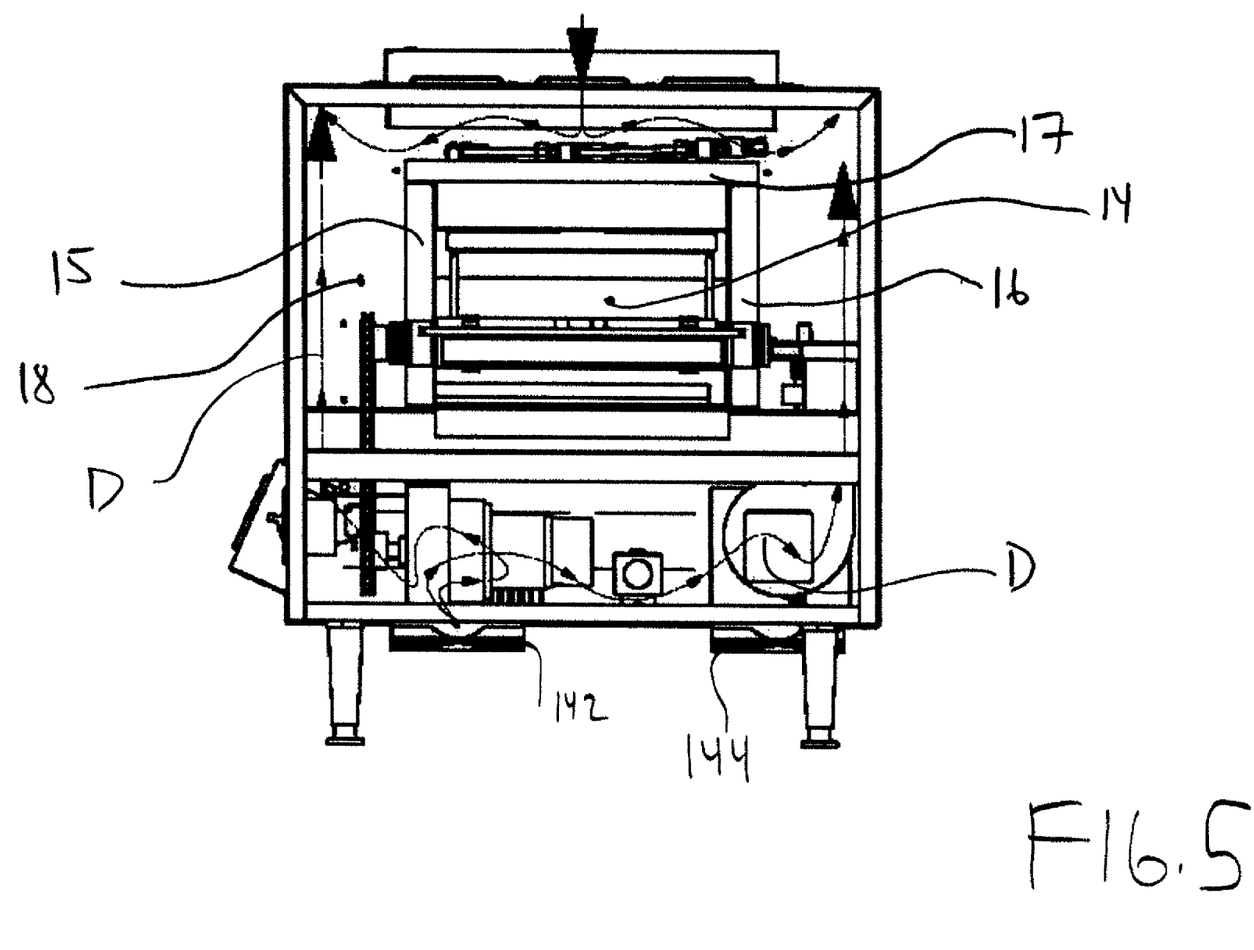
FIG. 5 is rear cross-sectional view of the combination conveyor oven of FIG. 1 showing a portion of the internal cooling air flow path.
Figure 9:
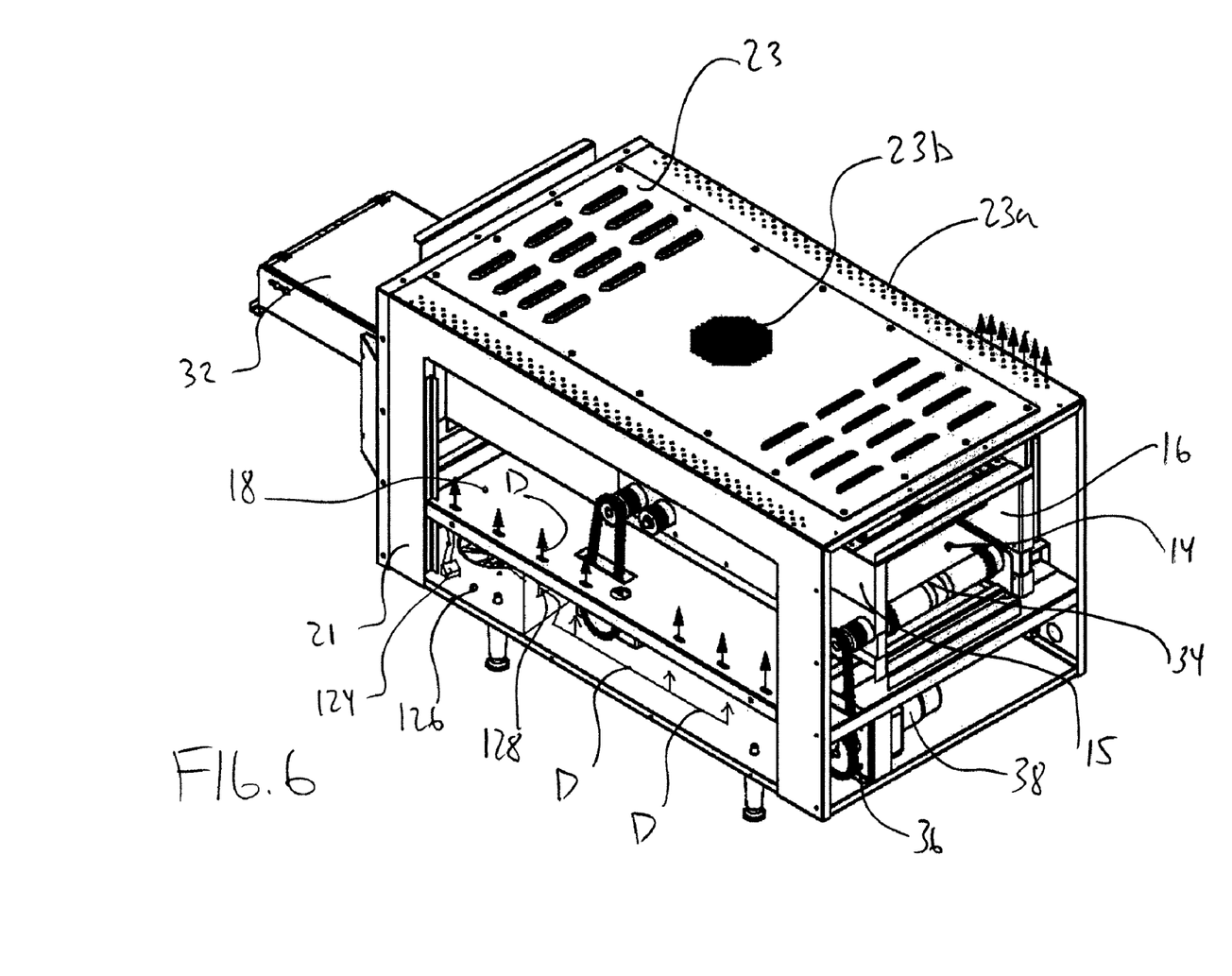

As best shown in FIGS. 1, 5, and 6, a boundary layer cooling system 140 is provided to supply a cooling air blanket to the inner surfaces of the right, left, top, and bottom sides 21, 22, 23, 26 to maintain these surfaces at relatively low temperatures when the oven 10 is operating. Through operational testing, the use of the boundary layer cooling system 140 described and shown herein maintained the surface temperatures of the right, left, and top sides 21, 22, 23 at less than 100° F. when the oven 10 was at normal operating temperature.

The boundary layer cooling system 140 includes an electronics cooling fan 142 which is attached to the bottom 26 of the housing 20 and draws suction from the ambient air. As best shown in FIG. 6, the air flows through the electronics fan 142 into a substantially enclosed electronics chamber 126. The electronics chamber 126 houses the controller 124 and the remainder of electrical control components that are provided to control the operation of the oven 10. The electronics chamber 126 includes an air outlet 128, which leads into the mechanical volume 18 of the housing 20. In some embodiments, the air outlet 128 from the electronics chamber is sized to limit the flow rate of air out of the electronics chamber so that a positive pressure is maintained within the electronics chamber, which substantially prevents foreign materials or dirt from entering the electronics chamber. As shown in FIGS. 5 and 6, air flows through the majority of the mechanical volume 18, including along the majority of the inner surfaces of the right and left side panels 21, 22. This cooling air flow path is shown with element D in the figures.

As discussed above, and shown in FIG. 1, the top panel 23 includes a plurality of outlet apertures 23a formed therein to allow the cooling air to exit the oven 10. The outlet apertures 23a additionally allow the cooling air that enters the oven 10 through heater fan 146 and passes over heating elements 61 to leave the oven 10. The heating element cooling air flow path is marked in FIG. 5 by element E.

As discussed above and best shown in FIG. 2, the conveyor system 30 may be formed from a first conveyor 32 and a second conveyor 34. Each of the first and second conveyors 32, 34 is provided with its top moving surface (i.e. the surface suitable to carry the food product 12) positioned in the same horizontal plane, with the exit of the first conveyor 32 in close proximity to the entrance to the second conveyor 34. A front portion of the first conveyor 32 extends through the inlet opening 24a and out of the housing 20 such that a food product 12 may be placed on the first conveyor 32 without the user being required to reach into the internal cooking volume 14 of the housing. The first conveyor extends into the housing 20 below the top and side steam pipes 50, 52.

The second conveyor 34 is positioned in proximity to the end of the first conveyor 32 and extends below the heating elements 61 and above the top plate 94 of the forced convection system 80. As shown in FIG. 4, the second conveyor 34 is operated with a transmission 36 that is connected to a motor 38. The first conveyor 32 includes a separate transmission (not shown) and a separate motor (not shown) and operates in a similar manner to the second conveyor 34.

The oven 10 includes two separate conveyors 32, 34 that operate with independent motors and transmissions to allow the two conveyors to be operated at different speeds. Accordingly, the relative speeds of the first and second conveyors 32, 34 may be adjusted to increase or decrease the time that the food product 12 is in the vicinity of the steam pipes 50, 52 and the heating elements 61 and forced convection flow. As is known in the art, amount of heat or steam being delivered by the various systems of the oven may change over time, and each conveyor 32, 34 may be separately adjusted to ensure that the food product 12 receives the appropriate amount of energy from each different system for desired cooking. Each of the first and second conveyors 32, 34 is supported by the conveyor frame 31, which is supported within the housing 20. In some embodiments, and as shown in FIG. 3, the conveyor frame 31 includes a slot 31b, which allows the structures forming the heating and outlet chambers 86, 88 to be supported by the conveyor frame 31.

The oven 10 additionally may include an input device (not shown) and a display (not shown) to allow the user to directly control the operation of the oven 10. The input device may be a standard keyboard that allows data and selected parameters to be entered and communicated with the controller 124. The controller may operate a display that provides the user with a plurality of indications regarding the operation of the oven 10. For example, the display may provide indications of the temperatures of each heating element 61 and the convection heating element 81. Additionally, the display may provide indications of other parameters within the oven. For example, temperature detectors may be provided in the vicinity of multiple locations within the inner cooking volume 14 and the conveyor 30 to display the temperature that is being felt by the food product 12. Other types of detectors may also be provided within the oven 10 and operated by the controller 124 that are known in the art to monitor and display a plurality of selected parameters involving the operation of the oven 10 that are known in the art.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

What is claimed is:

1. An oven for cooking a food product comprising:
   a housing with an inlet opening and an outlet opening;
   a conveyor to move a food product through the housing from the inlet opening to the outlet opening;
   a steam generator for producing steam from liquid provided to the steam generator;
   a steam pipe provided within the housing and in fluid communication with the steam generator, the steam pipe and the steam generator configured to direct a source of steam toward the food product and heat from the steam to infuse within an internal volume of the food product; and
   a plurality of heating elements provided within the housing and between the steam pipe and the outlet opening.

2. The oven of claim 1, wherein the steam generator produces superheated steam.

3. The oven of claim 1, wherein the steam pipe includes a plurality of apertures in the proximity of the conveyor to allow steam flowing through the steam pipe to exit the pipe proximate to the food product.

4. The oven of claim 3, wherein a portion of the steam pipe is disposed to direct steam to impinge a top surface of the food product.

5. The oven of claim 3, wherein a portion of the steam pipe is disposed to direct steam to impinge a side surface of the food product.

6. The oven of claim 1, further comprising a sensor capable of detecting the food product on the conveyor, the sensor operatively connected with a controller that is configured to selectively provide liquid to the steam generator based on the operation of the sensor.

7. The oven of claim 1, wherein the plurality of heating elements are positioned along the length of the housing between the steam pipe and the outlet opening, wherein a space between neighboring heating elements increases as the heating elements are provided further from the steam pipe.

8. The oven of claim 1, further comprising a plurality of exterior surfaces of the housing, an air conduit defined in proximity to the plurality of exterior surfaces, and a fan positioned to move air through the air conduit to cool the plurality of exterior surfaces of the housing.

9. The oven of claim 1, wherein the plurality of heating elements are disposed above the conveyor within the housing, and further comprising a second heating element disposed below the conveyor within the housing.

10. The oven of claim 9, further comprising a convection air flow path past the second heating element and upward through the conveyor, wherein heated air is urged to flow through the path by a fan.

11. The oven of claim 1, wherein the conveyor comprises a first conveyor disposed under the steam pipe and a second conveyor disposed under the plurality of heating elements.

12. The oven of claim 11, wherein the first conveyor and second conveyor may be moved at different speeds to vary the time that the food product is in the vicinity of each of the steam pipe and the plurality of heating elements.

13. The oven of claim 1, wherein the plurality of heating elements are additionally disposed between the inlet opening and the steam pipe.

14. The oven of claim 1, wherein the oven is configured for the food service industry for heating a product to be immediately presented to a customer for consumption.

* * * * *